United States Patent [19]

Arbib

[11] 3,822,065

[45] July 2, 1974

[54] CLEANING OF GRAMOPHONE RECORDS

[75] Inventor: Richard Arbib, Gerrards Cross, England

[73] Assignee: Multicore Solders Limited, London, England

[22] Filed: Aug. 6, 1973

[21] Appl. No.: 385,658

[30] Foreign Application Priority Data

Aug. 15, 1972 Great Britain .................38099/72

[52] U.S. Cl. .................................... 274/47, 274/47

[51] Int. Cl. ........................................... G11b 3/58

[58] Field of Search ....................................... 274/47

[56] References Cited

UNITED STATES PATENTS

| | | | |
|---|---|---|---|
| 1,318,145 | 10/1919 | Harbaugh | 274/47 |
| 2,773,692 | 12/1956 | Dunnavan | 274/47 |
| 3,185,485 | 5/1965 | Brubaker | 274/47 |

FOREIGN PATENTS OR APPLICATIONS

| | | | |
|---|---|---|---|
| 1,240,577 | 8/1960 | France | 274/47 |

*Primary Examiner*—Harry N. Haroian
*Assistant Examiner*—John W. Shepperd
*Attorney, Agent, or Firm*—Finnegan, Henderson, Farabow & Garrett

[57] ABSTRACT

There is disclosed a gramophone pick-up attachment which comprises a first part attached to a pick-up cartridge or arm, a second part pivotally connected to the first part with a pivot axis which is substantially horizontal when the pick-up is in use, the second part carrying a record-cleaning device in the form of a brush for engagement with the playing surface of a record whilst it is being played, and a third part pivotally connected to the first part with a pivot axis which is substantially horizontal when the pick-up is in use, the third part carrying a record-cleaning device in the form of a pad for engagement with the playing surface of a record whilst it is being played. There are no springs engaging any of the first, second and third parts and the construction and arrangement of these three parts is such that the second part can pivot with respect to the first part about its pivot axis but its pivoting is limited in that it is prevented from pivoting so far in one direction that the part of the brush which contacts the record comes vertically below its pivot axis when the pick-up is in use and the third part can pivot with respect to the first part about its pivot axis but its pivoting is limited in that it is prevented from pivoting so far in one direction that the part of the pad which contacts the record comes vertically below its pivot axis when the pick-up is in use.

14 Claims, 7 Drawing Figures

PATENTED JUL 2 1974 3,822,065

CLEANING OF GRAMOPHONE RECORDS

BACKGROUND OF THE INVENTION

Figures 1, 2:
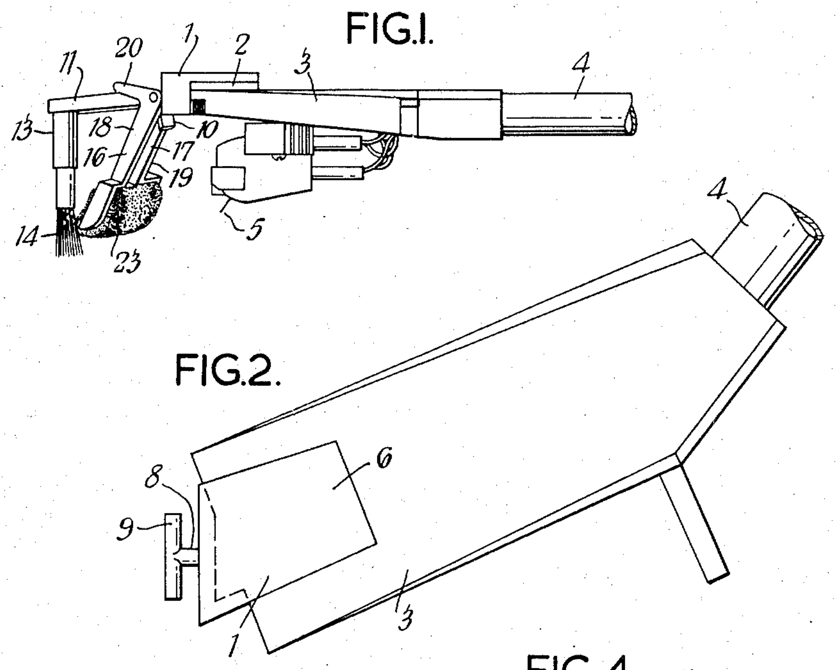

This invention relates to the cleaning of gramophone records.

It is desirable in a record-cleaning attachment including at least one record cleaning device and which is attached to a gramophone pick-up for cleaning the playing surface of a record as it is being played, that the or each device does not drag across the surface when the pick-up arm is moving from the end of the record just played to the outside of the stack when a stack of records are being played by the gramophone. Also it is desirable that when the pick-up arm is swung into its proper position above the record and is lowered towards the record, the or each cleaning device engages the upper surface of the record before the stylus does and the part carrying it swings away from the stylus until the stylus engages the record, after which the record is played and its playing surface simultaneously cleaned.

In British Pat. specification No. 912,914 a record-cleaning attachment for a gramophone pick-up comprises a first part for attachment to a pick-up, a second part pivotally connected to the first part for vertical movement, and carrying at least one record-cleaning device, and spring-biasing means arranged between said parts, the spring means imposing an upward force on the first part while a record surface is being cleaned for reducing the vertical force on the stylus.

THE INVENTION

The objects of this invention are to provide a gramophone pick-up having attached to it a record-cleaning attachment, and a record-cleaning attachment for a gramophone pick-up, in which the use of spring means in the attachment is avoided.

According to this invention there is provided a gramophone pick-up comprising an assembly which comprises a pick-up arm and a pick-up cartridge including a stylus, a first part attached to said assembly, a second part pivotally connected to said first part with a pivot axis which is substantially horizontal when the pick-up is in use, a record-cleaning device, carried by said second part, in the form of a brush for engagement with the playing surface of a record whilst it is being played, a third part pivotally connected to said first part with a pivot axis which is substantially horizontal when the pick-up is in use, and a record-cleaning device, carried by said third part, in the form of a pad for engagement with the playing surface of a record whilst it is being played, one of said second and third parts having its pivoting limited by a portion thereof abutting a portion of said first part and the other of the second and third parts having its pivoting limited by a portion thereof abutting a portion of said one part, the construction and arrangement of said first, second and third parts being such that said second part can pivot with respect to said first part about its pivot axis but its pivoting is limited in that it is prevented from pivoting so far in one direction that the part of said brush which contacts the record comes vertically below its pivot axis when the pick-up is in use and said third part can pivot with respect to said first part about its pivot axis but its pivoting is limited in that it is prevented from pivoting so far in one direction that the part of said pad which contacts the record comes vertically below its pivot axis when the pick-up is in use.

According to this invention from another aspect there is provided an attachment for a gramophone pick-up which comprises an assembly of a pick-up arm and a pick-up cartridge including a stylus, the attachment comprising a first part for attachment to the assembly, a second part pivotally connected to said first part with a pivot axis which is substantially horizontal when the pick-up is in use, a record-cleaning device, carried by said second part, in the form of a brush for engagement with the playing surface of a record whilst it is being played, a third part pivotally connected to said first part with a pivot axis which is substantially horizontal when the pick-up is in use, and a record-cleaning device, carried by said third part, in the form of a pad for engagement with the playing surface of a record whilst it is being played, one of said second and third parts having its pivoting limited by a portion thereof abutting a portion of said first part and the other of the second and third parts having its pivoting limited by a portion thereof abutting a portion of said one part, the construction and arrangement of said first, second and third parts being such that said second part can pivot with respect to said first part about its pivot axis but its pivoting is limited in that it is prevented from pivoting so far in one direction that the part of said brush which contacts the record comes vertically below its pivot axis when the pick-up is in use and said third part can pivot with respect to said first part about its pivot axis but its pivoting is limited in that it is prevented from pivoting so far in one direction that the part of said pad which contacts the record comes vertically below its pivot axis when the pick-up is in use.

Said second and third parts preferably have a common pivot axis. Advantageously said one part includes a substantially L-shaped portion, one leg of which engages said portion of the first part to limit pivoting of said one part and the other leg of which has one of the record-cleaning devices mounted at its free end and said other part includes two substantially parallel and substantially L-shaped portions side by side and spaced apart, between which is some of said one part, the other of the record-cleaning devices being mounted on the free ends of an arm of one of these portions and an arm of the other of these portions, the free ends of the other arms of these portions being connected together by a connecting piece which abuts said portion of said one part, which is on said other leg.

Preferably the first part includes a pivot pin supported only at its centre, said other part having holes in its said two portions, into which project the ends of the pivot pin, and said one part having a recess where its two legs join in which the pin lies.

Said one part is preferably the second part and the brush in use preferably engages the record at a greater distance from the stylus than does the pad.

Figure 4:
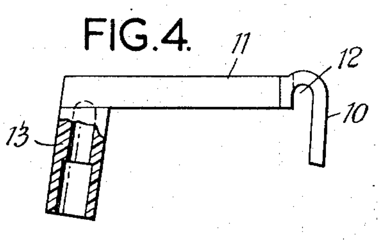
Figure 3:
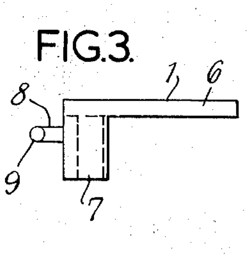
Figure 6:
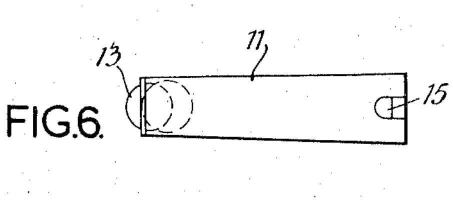
Figure 5:
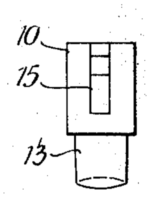
Figure 7:
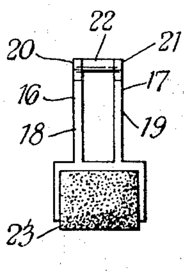

An example in accordance with the invention is described below with reference to the accompanying drawing, in which:

FIG. 1 shows a side view of part of a gramophone pick-up having attached to it a device for cleaning gramophone records whilst they are being played, FIG. 2 shows a plan view of part of what is shown in FIG. 1, FIG. 3 shows a side view of part of what is shown in FIG. 2, FIGS. 4 and 5 show side views and FIG. 6 shows a plan view of a further part of what is shown in FIG. 1, and FIG. 7 shows a side view of another part that is shown in FIG. 1.

In the example, a first part 1 of a device for cleaning gramophone records whilst they are being played is secured by an adhesive layer on a pad 2 to the upper surface of a pick-up cartridge 3 secured on a pick-up arm 4 and carrying a stylus 5, the parts 3 to 5 being parts of a conventional automatic record-change gramophone. Instead, a modified form of the first part 1 could be secured directly to the arm 4. The illustrated part 1 is substantially L-shaped as seen from one side, having a horizontal limb 6 which is secured by the adhesive and a vertical limb 7 which extends downwardly across the extreme end of the cartridge. The limb 7 carries a projection 8 which connects to the limb 7 the centre of a pivot pin 9. The parts 6 to 9 are parts of a one-piece moulding of plastics material. A second such moulding is shown in FIGS. 4 to 6. It includes a substantially L-shaped portion having a vertical leg 10 and a horizontal leg 11, there being a recess 12 where its two legs join, in which lies the pivot pin 9 when the parts of the device are assembled. This moulding also includes a brush holder 13 in which is secured, by an adhesive, a brush 14. A hole 15 is formed in the leg 10. A third one-piece moulding of plastics material comprises two substantially parallel and substantially L-shaped portions 16 and 17 each having a nearly vertical arm 18 or 19 and a nearly horizontal arm 20 or 21, the free ends of the arms 20 and 21 being connected together by a connecting piece 22 which rests on the top of the leg 11 when the parts are assembled. At the free ends of the arms 18 and 19 there is supported a pad 23 of velvet or plush material which is not rotatable. Two holes near the junctions of the arms 18 and 20 and 19 and 21 receive the ends of the pivot pin 9. The part carrying the brush 14 and the part carrying the pad 23 are both, by virtue of what is described above, pivotally connected to the part 1, the pivot axis being common and horizontal and being the axis of the pivot pin 9.

When a record drops on to the turntable and the pick-up arm is automatically swung into its proper position above the record, the brush 14 and the pad 23 engage the upper surface of the record before the stylus does and the parts carrying them then swing clockwise (considering FIG. 1) until the stylus engages the record, after which the record is played and its playing surface is simultaneously cleaned by the brush and the pad, either or both of which could be moistened with water or a special anti-static or cleaning fluid if desired. The brush engages the record at a greater distance from the stylus than does the pad but their positions could be interchanged.

It is ensured that the parts carrying the brush and the pad do in fact swing clockwise when they alight on the record by ensuring that the parts of them which engage the record cannot, by anti-clockwise movement, come vertically below the axis of the pivot pin 9. This is ensured by the leg 10 abutting the limb 7 and the connecting piece 22 abutting the leg 11, which lies between the L-shaped portions 16 and 17. By the same measure the brush and the pad do not drag across the playing surface when the arm is moving from the end of the record to the outside of the stack when a stack of records are being played automatically.

When the record is being played, the connecting piece 22 is spaced from the leg 11.

There are no springs engaging any of the parts shown in the drawings, except at the end of the arm 4 which is not illustrated.

I claim:

1. A gramophone pick-up comprising an assembly which comprises a pick-up arm and a pick-up cartridge including a stylus, a first part attached to said assembly, a second part pivotally connected to said first part with a pivot axis which is substantially horizontal when the pick-up is in use, a record-cleaning device, carried by said second part, in the form of a brush for engagement with the playing surface of a record whilst it is being played, a third part pivotally connected to said first part with a pivot axis which is substantially horizontal when the pick-up is in use, and a record-cleaning device, carried by said third part, in the form of a pad for engagement with the playing surface of a record whilst it is being played, one of said second and third parts having its pivoting limited by a portion thereof abutting a portion of said first part and the other of the second and third parts having its pivoting limited by a portion thereof abutting a portion of said one part, the construction and arrangement of said first, second and third parts being such that said second part can pivot with respect to said first part about its pivot axis but its pivoting is limited in that it is prevented from pivoting so far in one direction that the part of said brush which contacts the record comes vertically below its pivot axis when the pick-up is in use and said third part can pivot with respect to said first part about its pivot axis but its pivoting is limited in that it is prevented from pivoting so far in one direction that the part of said pad which contacts the record comes vertically below its pivot axis when the pick-up is in use.

2. A pick-up according to claim 1, in which said one part includes a substantially L-shaped portion, one leg of which engages said portion of the first part to limit pivoting of said one part and the other leg of which has one of the record-cleaning devices mounted at its free end, and said other part includes two substantially parallel and substantially L-shaped portions side by side and spaced apart, between which is some of said one part, the other of the record-cleaning devices being mounted on the free ends of an arm of one of these portions and an arm of the other of these portions, the free ends of the other arms of these portions being connected together by a connecting piece which abuts said portion of said one part, which is on said other leg.

3. A pick-up according to claim 1, in which said one part is said second part.

4. A pick-up according to claim 1, in which, in use, said brush engages the record at a greater distance from said stylus than does said pad.

5. A pick-up according to claim 1, in which said second and third parts have a common pivot axis.

6. A pick-up according to claim 5, in which said one part includes a substantially L-shaped portion, one leg of which engages said portion of the first part to limit pivoting of said one part and the other leg of which has one of the record-cleaning devices mounted at its free end, and said other part includes two substantially parallel and substantially L-shaped portions side by side and spaced apart, between which is some of said one part, the other of the record-cleaning devices being mounted on the free ends of an arm of one of these portions and an arm of the other of these portions, the free ends of the other arms of these portions being connected together by a connecting piece which abuts said portion of said one part, which is on said other leg.

7. A pick-up according to claim 6, in which said first part includes a pivot pin supported only at its centre, said two portions of said other part defining holes into which project the ends of said pivot pin, and said one part defining a recess where its two legs join in which said pin lies.

8. An attachment for a gramophone pick-up which comprises an assembly of a pick-up arm and a pick-up cartridge including a stylus, the attachment comprising a first part for attachment to the assembly, a second part pivotally connected to said first part with a pivot axis which is substantially horizontal when the pick-up is in use, a record-cleaning device, carried by said second part, in the form of a brush for engagement with the playing surface of a record whilst it is being played, a third part pivotally connected to said first part with a pivot axis which is substantially horizontal when the pick-up is in use, and a record-cleaning device, carried by said third part, in the form of a pad for engagement with the playing surface of a record whilst it is being played, one of said second and third parts having its pivoting limited by a portion thereof abutting a portion of said first part and the other of the second and third parts having its pivoting limited by a portion thereof abutting a portion of said one part, the construction and arrangement of said first, second and third parts being such that said second part can pivot with respect to said first part about its pivot axis but its pivoting is limited in that it is prevented from pivoting so far in one direction that the part of said brush which contacts the record comes vertically below its pivot axis when the pick-up is in use and said third part can pivot with respect to said first part about its pivot axis but its pivoting is limited in that it is prevented from pivoting so far in one direction that the part of said pad which contacts the record comes vertically below its pivot axis when the pick-up is in use.

9. An attachment according to claim 8, in which said one part includes a substantially L-shaped portion, one leg of which engages said portion of the first part to limit pivoting of said one part and the other leg of which has one of the record-cleaning devices mounted at its free end and said other part includes two substantially parallel and substantially L-shaped portions side by side and spaced apart, between which is some of said one part, the other of the record-cleaning devices being mounted on the free ends of an arm of one of these portions and an arm of the other of these portions, the free ends of the other arms of these portions being connected together by a connecting piece which abuts said portion of said one part, which is on said other leg.

10. An attachment according to claim 8, in which said one part is said second part.

11. An attachment according to claim 8, in which, in use, said brush engages the record at a greater distance from the stylus than does said pad.

12. An attachment according to claim 8, in which said second and third parts have a common pivot axis.

13. An attachment according to claim 12, in which said one part includes a substantially L-shaped portion, one leg of which engages said portion of the first part to limit pivoting of said one part and the other leg of which has one of the record-cleaning devices mounted at its free end and said other part includes two substantially parallel and substantially L-shaped portions side by side and spaced apart, between which is some of said one part, the other of the record-cleaning devices being mounted on the free ends of an arm of one of these portions and an arm of the other of these portions, the free ends of the other arms of these portions being connected together by a connecting piece which abuts said portion of said one part, which is on said other leg.

14. An attachment according to claim 13, in which said first part includes a pivot pin supported only at its centre, said two portions of said other part defining holes into which project the ends of said pivot pin, and said one part defining a recess where its two legs join in which said pin lies.

* * * * *